United States Patent
Hohenegger et al.

(10) Patent No.: US 6,275,332 B1
(45) Date of Patent: *Aug. 14, 2001

(54) METHOD OF MAKING HIGH-REFLECTION MIRRORS

(75) Inventors: Karl Hohenegger, Balzers (LI); Peter Wierer, Bludenz (AT); Christian Beyeler, Wadenswil (CH)

(73) Assignee: Unaxis Balzers Aktiengesellschaft, Balzers (LI)

( * ) Notice: Subject to any disclaimer, the term of this patent is extended or adjusted under 35 U.S.C. 154(b) by 0 days.

This patent is subject to a terminal disclaimer.

(21) Appl. No.: 09/648,977

(22) Filed: Aug. 28, 2000

Related U.S. Application Data

(60) Division of application No. 09/074,077, filed on May 7, 1998, now Pat. No. 6,128,126, which is a continuation-in-part of application No. 08/618,900, filed on Mar. 20, 1996, now Pat. No. 5,751,474, which is a continuation of application No. 08/228,402, filed on Apr. 15, 1994, now Pat. No. 5,548,440.

(30) Foreign Application Priority Data

Apr. 15, 1993 (CH) .................................................. 1139/93

(51) Int. Cl.⁷ ................................ G02B 1/10; G02B 5/08; G02B 5/26

(52) U.S. Cl. .......................... 359/360; 359/584; 359/585; 359/589; 359/883; 359/900

(58) Field of Search ..................................... 359/359, 360, 359/584, 585, 589, 883, 884, 900

(56) References Cited

U.S. PATENT DOCUMENTS

| | | | |
|---|---|---|---|
| 3,712,980 | * | 1/1973 | Norton . |
| 4,312,570 | * | 1/1982 | Southwell . |
| 4,379,622 | * | 4/1983 | Fischer et al. . |
| 4,413,877 | * | 11/1983 | Suzuki et al. . |
| 4,799,745 | * | 1/1989 | Meyer et al. . |
| 5,548,440 | * | 8/1996 | Hohenegger et al. ............... 359/883 |
| 5,751,474 | * | 5/1998 | Hohenegger et al. ............... 359/883 |
| 6,128,126 | * | 10/2000 | Hohenegger et al. ............... 359/884 |

* cited by examiner

*Primary Examiner*—Ricky D. Shafer
(74) *Attorney, Agent, or Firm*—Notaro & Michalos P.C.

(57) ABSTRACT

An environmentally stable silver containing mirror having very high reflection values over a large spectral range comprises a silver containing layer disposed on a substrate, which is covered by a zinc sulfide layer. So that the sulfur being set free during the application or during the vaporization of the zinc sulfide to be applied, does not attack the silver, at least one barrier or intermediate layer is placed between the silver containing layer and the zinc sulfide layer.

17 Claims, 5 Drawing Sheets

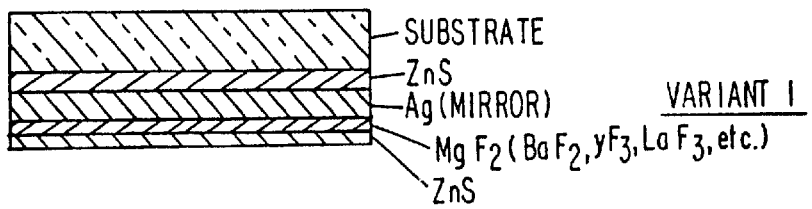
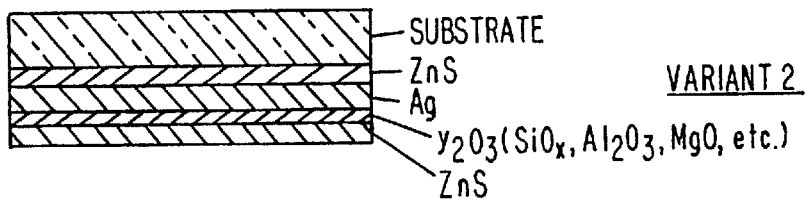
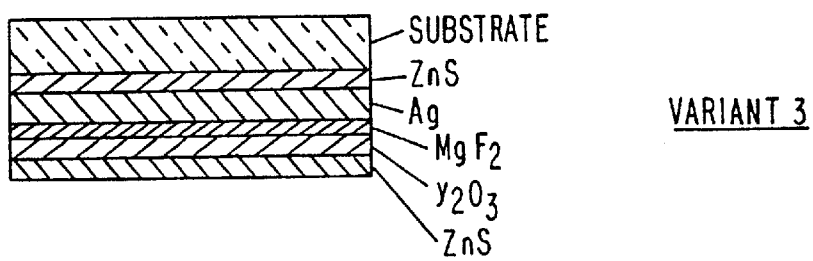
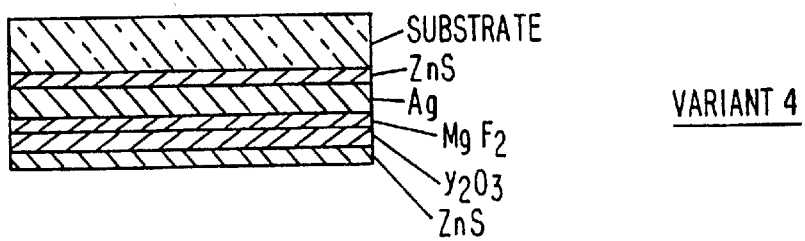
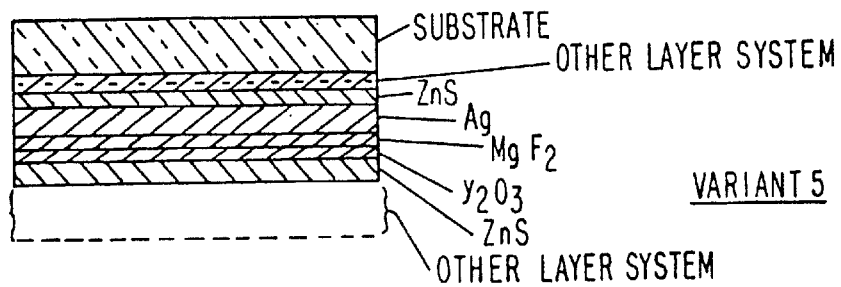

VARIANT 6

VARIANT 7

METHOD OF MAKING HIGH-REFLECTION MIRRORS

CROSS-REFERENCE TO RELATED APPLICATIONS

This is a divisional of U.S. patent application No. 09/074,077, May 7, 1998, U.S. Pat. No. 6,128,126, which is a CIP of U.S. Ser. No. 08/618,900 filed Mar. 20, 1996, now U.S. Pat. No. 5,751,474, which was a continuation of U.S. 08/228,402 filed Apr. 15, 1994, now U.S. Pat. No. 5,548,440 which claims priority from Swiss application number 1139/93 filed 1993.

FIELD AND BACKGROUND OF THE INVENTION

The present invention relates, in general, to a high-reflection silver containing mirror and specifically, to an environmentally stable silver containing mirror having very high reflection values over a wide spectral range.

Silver is a material with excellent optical properties. It is used inter alia In the protection of highly, reflecting mirrors and, in particular, for the production of elements for regulating solar energy transmission such as architectural glass coatings, heat protection layers, automobile windows and the like. The use of silver as an optical thin-film material is extensively described for example in the publication "Thin-film Optical Filters", H. A. Macleod, Adam Hilger Ltd., Second Edition. Unfortunately, silver has poor environmental compatibility, since it is, on the one hand, relatively soft and consequently can readily be mechanically damaged and, on the other hand, an impairment of optical properties occurs due to corrosion if the silver mirror is exposed without protection against the environment or specific media. Silver sulfides, for example, are formed.

For this reason silver layers are frequently packed in layer systems wherein the material selected for the remaining layers is determined, on the one hand, by the desired optical properties such as spectral properties as well as the other hand by the necessity of increasing the resistance of the silver layer relative % environmental influences. A consideration of the nucleation properties of silver on these materials is also of significance, however.

Oxides, zinc sulfide, nitrides or metals are frequently used in order to pack silver. In particular, oxides are used due to their optical properties and their resistance and also because of their hardness. Applying the oxide layer, however, can already cause a degradation of the silver which is the reason why, in prior art, measures tome been suggested in order to avoid this problem.

For example DR-OS-33 07 661 suggests first covering the silver layer with a further metal layer comprising aluminum, titanium, tantalum, chromium, manganese or zirconium, onto which further metal layers; and lastly art oxide layer are disposed, comprising indium oxide, tin oxide or a mixed oxide thereof. DE-OS-35 43 178 suggests a multilayer covering wherein the silver layer, in turn, is covered by a further metal layer comprising tantalum, tungsten, nickel or iron, which further metal layer, in turn, is covered by an oxide layer, wherein SnO, $SiO_2$, $Al_2O_3$, $Ta_2O_5$ or $ZrO_2$ are suggested as the oxide layers.

In analogous manner U.S. Pat. No. 3,682,528 suggests covering the silver layer with a thin nickel layer, should further layers be applied.

According to another variant, DE 33 27 256 suggests applying at least one hypostoichiometric oxide layer on the silver, comprising, for example, titanium oxide or titanium nitride or a mixture thereof.

DE-A-33 29 504 suggests covering the silver layer with a dielectric layer wherein the material composition in the region of the transition areas, changes gradually and continuously. Titanium oxide is mentioned, for example, as such a dielectric layer.

Lastly, the U.S. Pat. No. 5,510,173 describes substantially transparent copper and silver plus noble metal coatings. Their ability to withstand corrosive environments is improved by over-coating the metal layers with a double coating of dielectric. The first coating is made up of dielectric based on indium and/or zinc, the second coating is made up of dielectric based on indium and tin.

SUMMARY OF THE INVENTION

The task of the present invention resides in suggesting an environmentally stable silver containing mirror having very high reflection values over a very large special range.

According to the invention a high-reflection silver mirror of this type is suggested comprising at least one silver containing layer disposed on a substrate, which layer is covered by a zinc sulfide layer, characterized in that between the a silver containing layer and zinc sulfide layer, at least one barrier or intermediate layer is disposed.

A high-reflection silver mirror comprises at least one silver containing layer to be disposed an a substrate, which is covered by a zinc sulfide layer, wherein, as an essential feature of the invention, at least one intermediate layer or a barrier layer is placed between the silver containing layer and the zinc sulfide layer. This barrier layer comprises a dielectric material.

The at least one silver containing, layer to be disposed on a substrate is either made up predominantly of silver or of silver, including up to approximately 20 weight % of copper. In addition, this at least silver containing layer may include minor amounts of gold, platinum or palladium in addition to the adding of copper.

Materials for or the barrier or intermediate layer include oxides of the elements silicon, aluminum, magnesium, of groups VIb, Vb, and IVb, as well as scandium yttrium, calcium, strontium, zinc, iron, indium, tin, cerium, holmium as well as oxides of mixtures or alloys of these elements (in particular indium tin oxide); and further oxinitrides of the elements Tin Ta, Zr, Si, Hf, and Al, as well as fluorides of the elements magnesium, barium, strontium, calcium, the rare earths and lead.

According to a preferred embodiment magnesium fluoride is used for production of the barrier car intermediate layer, wherein the layer thickness can be determined by the desired optical function in general is <1 $\mu$m, but preferably <100 nm According to a further embodiment it is also possible to provide two barrier or intermediate layers, wherein the one barrier or late layer is an oxide and the other is a fluoride.

According to the invention it is also essential to provide, between the substrate and the silver containing layer, at least one further intermediate layer, wherein this layer again is mainly a protective layer. This further ate layer can comprise for example zinc sulfide. For particular applications it may be necessary that, in addition to this layer, further layers must be placed between the substrate and the silver containing layer, be that in order to increase further the reflection (application of optical correction layers, for example with so-called rear-surface mirrors) or for the purpose of applying adhesion enhancing layers.

Very high reflection values were measured on environmentally stable silver containing mirrors, deflection mirrors for angles of incidence of 45° produced according to the invention, cover a very large spectral range such as for example in the range from 400 nm to 12,500 nm. The reflection values are greater than 95%. In the wave range from 420 nm to 580 nm and fax wavelengths>1,200 nm, even reflection values≧98% were measured. In the range form 2,500 nm to 12,500 nm and from 20,000 nm to 50,000 nm even reflection values>98.5% are obtained. These values apply for non-polarized light.

The various features of novelty which characterize the invention are pointed out with particularity in the claims annexed to and forming a part of this disclosure. For a better of the invention, its operating advantages and specific objects attained by its uses, reference is made to the accompanying drawing and descriptive matter in which preferred embodiments of the invention are illustrated.

BRIEF DESCRIPTION OF THE DRAWINGS

In the drawings:

FIGS. 3a, 3b, 3c, 3d, 3e, 3f and 3g are schematic views of five variants of the-invention.

DESCRIPTION OF THE PREFERRED EMBODIMENTS

Figure 1:
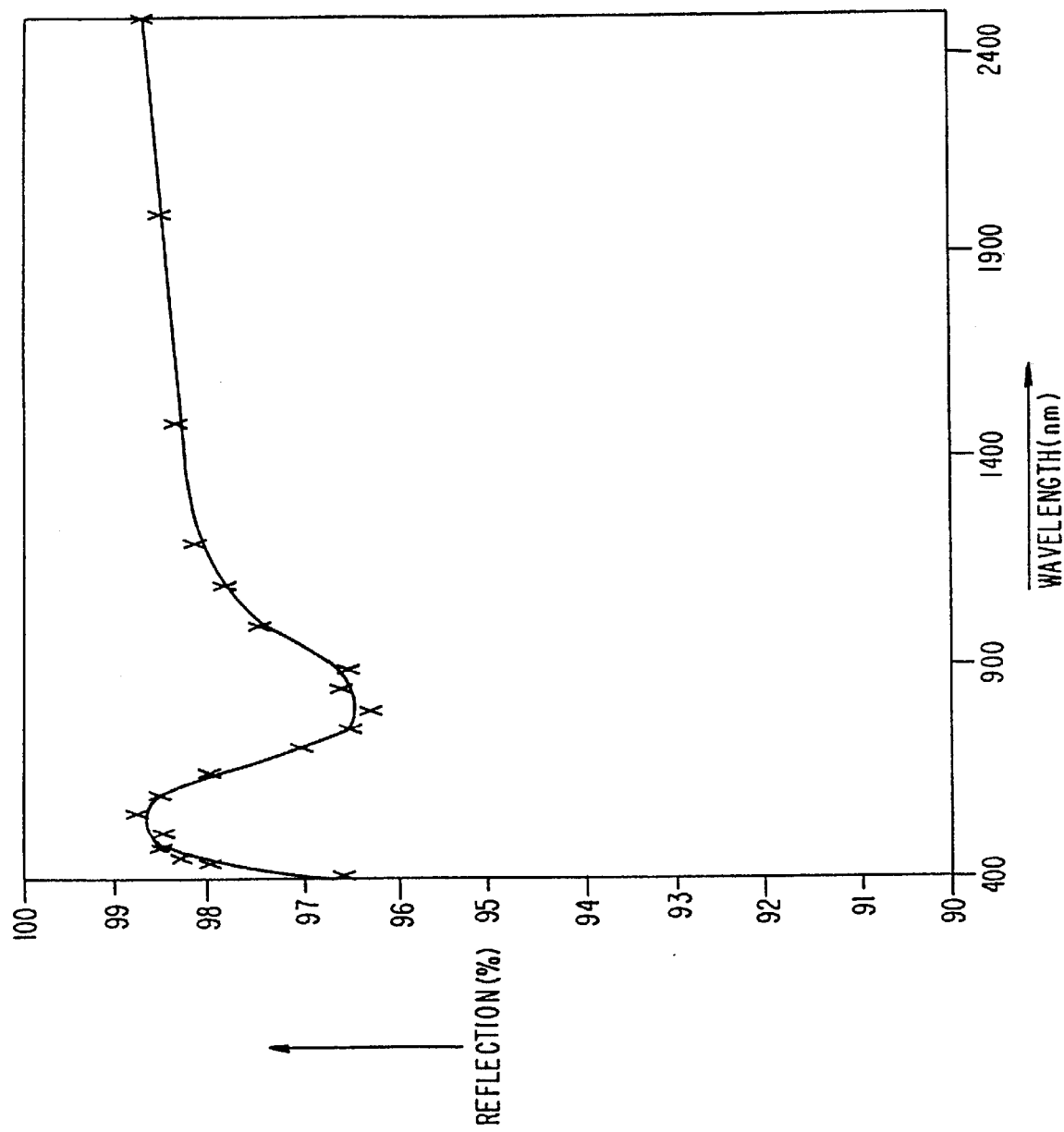
FIG. 1 is a graph showing the reflection of a mirror of the present invention in the range from 400 nm to 2500 nm.

Solutions for providing the high-reflection silver mirror according to the invention can have the following layer structure with layer thicknesses in the ranges given:
Substrate:
  for example glass
Yttrium oxide:
  in a layer thickness of approximately 20 to 250 nm ($Y_2O_3$) as the base layer for zinc sulfide,
Zinc sulfide:
  in a layer thickness of 20 nm to 200 nm
  (ZnS) as the nucleation layer for silver,
Silver containing mirror
  ≧15 nm,
Magnesium fluoride layer
  in a layer thickness of 5 nm to 200 nm ($MgF_2$),
Yttrium oxide
  in a layer thickness of 5 nm to 100 nm wherein the two last stated layers protect the silver layer against reactions AN components of the succeeding layers, for example sulphur, and serve as spectral correction layers,
Zinc sulfide
  (ZnS) In a layer thickness of 5 nm to 500 nm as the outer protective layer with the required optical properties.

Mirrors according to the invention and produced in this manner have been found to be very environmentally stable and to satisfy the requirements of the MIL-C-13508C regulations which provide a precisely defined sequence of particular environmental tests. These mirrors, however, have primarily been found to be resistant against hydrogen sulfide ($H_2S$).

Within a silver/copper alloy with the amount of approximately 0.5–5 weight % of copper, the copper has minor influence on the spectral features of the whole systems. On the other hand, the environmental resistance can be essentially increased. For mirror applications, the silver layer may contain up to 20 weight copper.

Zinc sulfide is known to be a stable material and was found to be a favorable base for the silver. The zinc sulfide must absolutely not be applied on the silver, however, since sulphur, which is set free during the vaporization of ZnS, attacks the silver containing layer and the process thus becomes uncontrollable. This leads to a marked lowering of reflection, especially in the visible spectral range or wavelength range.

The substance of the invention resides in that the silver containing layer must so-to-speak be protected against the superjacent protective layer (ZnS), and this takes place by way of a barrier or intermediate layer The solutions attempted in the prior art described above, which suggest packing the silver containing layer metal or a hypostoichiometric oxide layer fail style as a rule these do not meet the optical specifications, in any case, not with very high reflection values, such as have been listed above. Me barrier or intermediate layer according to the invention is a thin layer of a fluoride of the elements magnesium barium, strontium calcium, the rare earths or lead or, and this surprisingly is counted to the prior art, a thin oxide layer of the elements silicon, aluminum, magnesium, groups VIb, Vb, IVb, as well as stadium, yttrium, calcium, strontium, zinc, iron, indium, tin, cerium, holmium, as well as oxides of mixtures or alloys of these elements (in particular indium-tin-oxide), further oxinitrides of the elements Ti, Ta, Zr, Si, Hf , or Al. In particular the use of magnesium fluoride as a thin layer over the silver is not obvious since, for example, in the prior art, such as for example is offered in the publication by Macleod, good $MgF_2$ must be applied hot, e.g. at 250° C., but at these temperatures silver, as a rule, degrades.

In contrast, according to the invention it is suggested to apply, for example the magnesium fluoride, "cold", e.g. at temperatures of approximately 80° C. and also selecting the layer thickness to be very thin, such as for example ≦about 200 nm. The application of magnesium fluoride is carried cut with conventionally known methods such as for example, by means of boat vaporization or vaporization by means of an electron beam or also by means of a sputtering process.

It is also essential that the- layers disposed above the silver containing layer are practically absorption-free, e.g. that these are dielectric, so that the optical requirements can be met.

Figure 2:
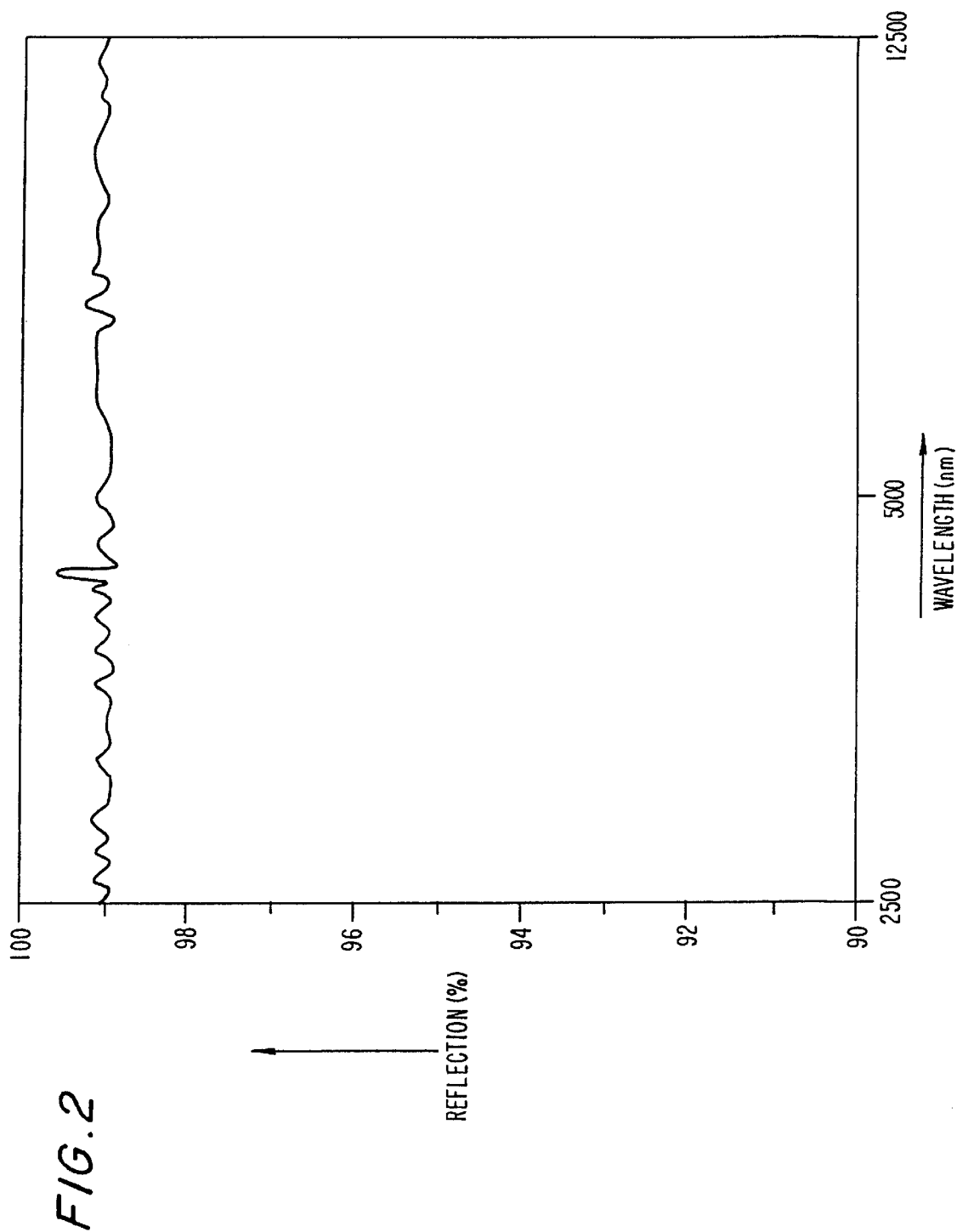
FIG. 2 is a graph similar to FIG. 1, but in the range from 2,500 nm to 12,500 nm.
Figure 3F:
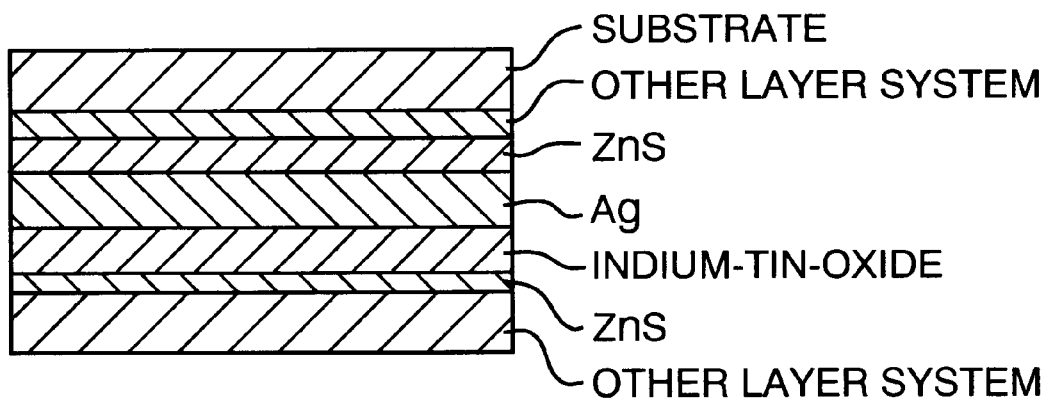
Figure 3G:
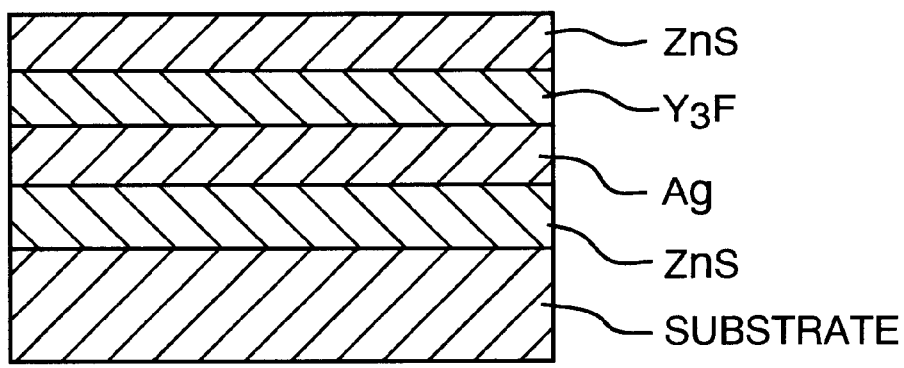

The invention will subsequently be additionally explained in conjunction with a concrete example and possible variants of the layer structure wherein the reflection of the mirror built by example, is depicted in FIG. 1 in the range from 400 nm to 2,500 nm and in FIG. 2 in the range from 2,500 nm, to 12,500 nm

EXAMPLE 1

A high-reflection silver mirror construction according to the invention has the following layer structure:

| | |
|---|---|
| Glass substrate (Corning 7059) | |
| Yttrium oxide: | appr. 140 nm |
| Zinc sulfide: | 55 nm |

|                    |          |
|--------------------|----------|
| Silver:            | 120 nm   |
| Magnesium fluoride:| 55 nm    |
| Yttrium oxide:     | appr. 20 nm |
| Zinc sulfide:      | 40 nm    |

All materials are applied in a conventional coating installation by means of vaporization wherein zinc sulfide was vaporized out of a vaporization boat. The remaining materials are vaporized by means of an electron beam vaporizer. It is also possible that all materials used are vaporized either from a boat as well as also with an electron gun.

FIG. 1 graphically depicts the reflection values of the silver mirror construction by example for 45 degree angles of incidence over the spectral range from 400 nm to 2,500 nm. In the range between 500 nm and 600 nm a maximum occurs with ≦98% and a minimum in the range of 700 nm to 900 nm with reflection values between 96% and 97%. This decrease of the reflection values in the range from 700 nm to 900 nm is the result of the specific layout of the layer system (and could be corrected by applying additional layers).

In the following some possible variants of a layer structure according to the invention will be listed, wherein these variants are depicted in FIGS. 3a, 3b, 3c, 3d and 3e, schematically and figuratively.

Variant 1:
 Substrate
 Zinc sulfide as the nucleation layer
 Silver: mirror
 Magnesium fluoride (also possible are barium fluoride, yttrium fluoride, lanthanum fluoride, cerium fluoride, lead fluoride, etc.) as the intermediate layer or the barrier
 Zinc sulfide as the outermost cover layer Variant 2:
 Zinc sulfide
 Silver
 Yttrium oxide (also possible are silicon oxide SiOx, aluminum oxide, magnesium oxide, hafnium oxide, zirconium oxide etc.)
 Zinc sulfide Variant 3:
 Substrate
 Zinc sulfide
 Silver
 Magnesium fluoride
 Yttrium oxide
 Zinc sulfide Variant 4:
 Abstract
 Substrate
 Zinc sulfide
 Silver
 Yttrium oxide
 Magnesium fluoride
 Zinc sulfide Variant 5:
 Substrate
 (any layer system)
 Zinc sulfide
 Silver
 Magnesium fluoride
 Indium-tin-oxide
 Zinc sulfide Variant 6 shows the presence of an indium-tin-oxide layer between the silver layer and the outer layer.

It is also conceivable that, In order to achieve particular additional optical effects (corrections of the spectral curve of reflections) layer packets, potentially even one of the variants themselves, are added to variants 1 to 4.

It is indeed possible Ina WA: Ilia zinc sulfide layer disposed between the silver and the substrate, however, it has been found to be extremely advantageous to apply such a layer, the last reason is that, since small defects ray occur in the silver layer, the subjacent zinc sulfide layer can prevent the silver mirror from being attacked from the direction of its rear surface, by means of the medium penetrating through the defect, and thus causing corrosion.

The zinc sulfide layer as the base of the silver layer, in addition suppresses the corrosion from the margins of the silver layer, in particular if relatively large substrates coated with the layer system according to the invention are to be divided to form individual units.

EXAMPLE 2

A high-reflection mirror, similar to Variant 2 of Example 1 has been applied. Instead of a pure silver layer of silver/copper layer has been applied within the layer structure. The presence of copper in the range of 1 to 2 weight % has no influence to the spectral properties of the mirror. In the range of 420 to 480 nm for a light angle of incidence of 45 degrees, the reflection values are more than 96%. Preferably in a range of 420 to 680 nm and a light angle of incidence of 45 degrees, the reflection values are even more than 95%, and even more preferably, in the range of altogether 400 to 12,500 nm the reflection values are more than 95%. However, mirrors with silver/copper alloys are essentially more resistant to environmental influences. Such kind of mirror or optical filter can be exposed to a test series according to the MIL-C-13580C standards without any damages to be recognized. Even after 4 to 5 runs of exposure, the mirror remains brilliant within-the range of specification. Even more, at least 7 to 8 runs of exposure may be possible, and still the specifications shall be fulfilled. In contrary to this, a silver mirror without copper may be damaged already after the second run. Corrosion spots may reduce the reflection.

Variant 7:
 Substrate zinc sulfide (55 nm)
 Silver/copper alloy (150 nm)
 Yttrium fluoride (50 nm)
 Zinc sulfide (30) nm)

Figure 4:
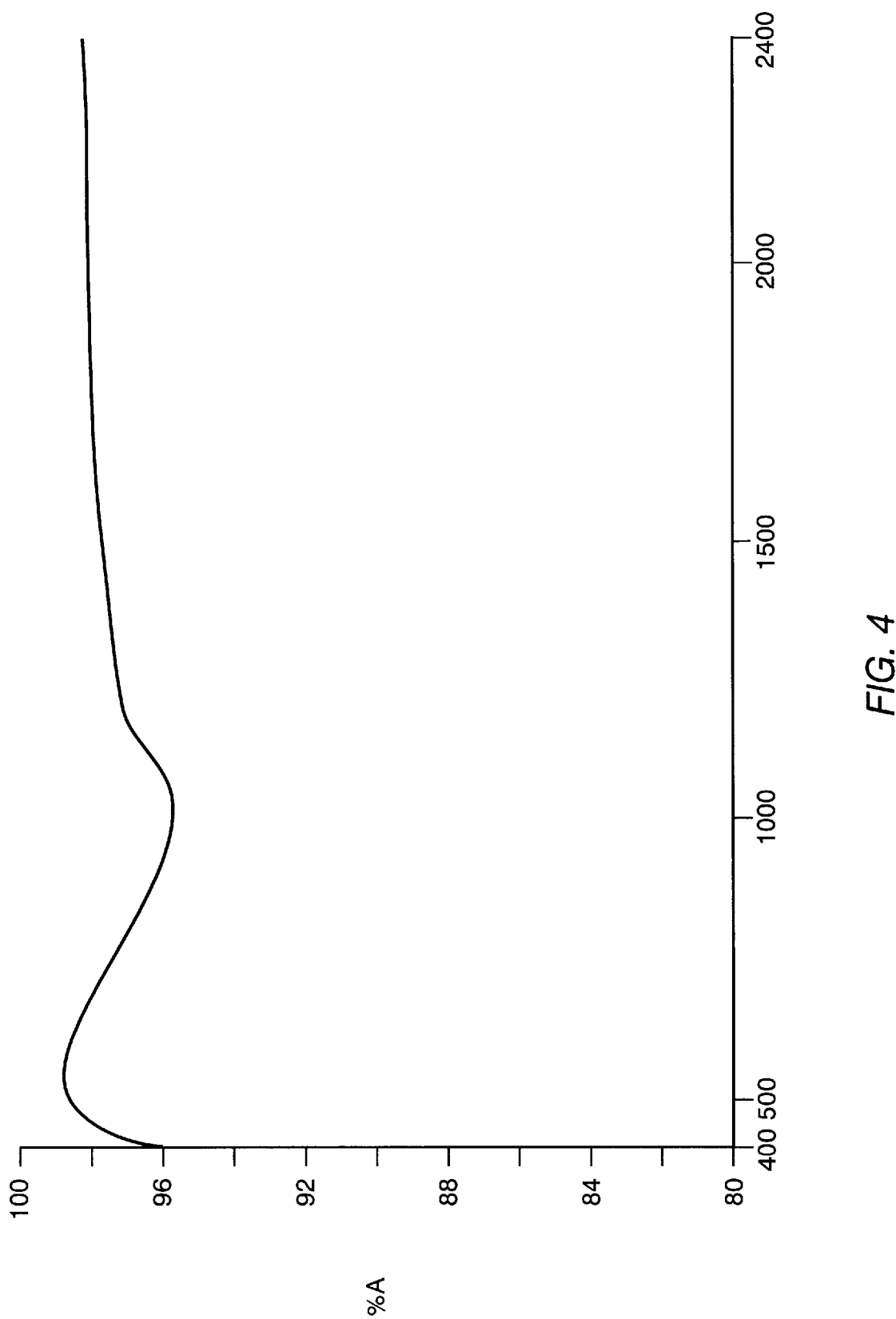
FIG. 4 is a graph like FIG. 1, but showing the results for Example 2.

FIG. 4 is a graph-showing the measured values of unpolarized light at 45° for Variant 7.

The silver containing mirrors and optical filters according to the invention listed in conjunction with the examples and embodiments, serve only for explaining the present invention, and it is understood that these can be varied or modified in any given way on the basis of the definitions in the claims. It is essential to the invention that between the silver containing mirror and a further protective layer a barrier or intermediate layer is disposed in order to permit additional protection of the silver containing layer and also in order to make possible high-reflection properties of the silver containing mirror. It is further advantageous that the Ag layer is applied on a zinc sulfide layer.

What is claimed:

1. A method of making a high-reflection mirror or thin-film optical filter comprising:

providing a substrate;

applying to the substrate, at least one optically high-reflective silver containing layer forming a mirror or optical filter, the silver containing layer also containing copper;

applying a barrier layer configuration on said at least one silver containing layer, the barrier layer configuration containing at least one layer; and applying a zinc sulfide layer on said barrier layer configuration;

the at least one silver containing layer, the barrier layer configuration and the zinc sulfide layer being applied so that with a light angle of incidence of 45°, and across a light spectrum of 400 nm to 12,500 nm, the silver containing mirror or optical filter has a reflection value greater than 95%.

2. A method according to claim including providing approximately 20% copper in the silver containing layer.

3. A method according to claim 1, including providing in the barrier layer configuration, at least one layer selected from the group consisting of oxides of silicon, aluminum, magnesium, a group VIb element, a group Vb element, a group IVb element, scandium, yttrium, calcium strontium, zinc, iron, indium, tin, cerium, holmium, and mixtures of said oxides.

4. A method according to claim 1, including providing the silver containing layer to have a reflection value greater than 96%.

5. A method according to claim 1, wherein the mirror or filter is environmentally stable and the zinc sulfide layer is provided so that across the light spectrum of 400 nm to 12,500 nm, the mirror or filter always has a reflection value greater than 96% across the entire spectrum for non-polarized light.

6. A method according to claim 5 including providing the barrier layer configuration to include at least one layer selected from the group consisting of: oxides of silicon, aluminum magnesium, a group IVb element, a group Vb element, a group VIb element, scandium, yttrium, calcium, atrontium, zinc, iron, indium, tin, cerium, and holmium; and mixtures of said oxides, an oxinitride of Ti, Ta, Zr, Si, Hf and Al, and a fluoride of magnesium, barium, strontium, calcium, a rare earth and lead.

7. A method according to claim 5, including providing the barrier layer configuration to include a dielectric material.

8. A method according to claim 5, including providing the barrier layer configuration to include indium-tin-oxide.

9. A method according to claim 5, including providing a second layer configuration containing at least one layer, on the zinc sulfide layer.

10. A method according to claims 5, including providing a first layer configuration containing at least one layer, between the substrate and the at least one silver layer.

11. A method according to claim 1, including providing a further layer configuration containing at least one layer, on the substrate, the silver containing layer being on the further layer configuration, the at least one layer of the barrier layer configuration having a thickness of from 5 to 200 nm, the zinc sulfide layer having a thickness of from 5 to 500 nm, the mirror or filter having a second layer configuration containing at least one layer on the zinc sulfide layer.

12. A method according to claim 11, including providing the barrier layer configuration to include a dielectric material.

13. A method according to claim 11, including providing the barrier layer configuration to include indium-tin-oxide.

14. A method according to claim 11, including providing at least one intermediate layer between the at least one silver containing layer and the zinc sulfide layer, the intermediate layer being made of a different material than that of the at least one barrier layer configuration.

15. A method according to claim 11, including providing a further zinc sulfide layer between the further layer configuration and the silver containing layer, the further zinc sulfide layer having a thickness of from 20 to 200 nm.

16. A method according to claim 11, including providing the barrier layer configuration to include at least one layer selected from the group consisting of: oxides of silicon, aluminum, magnesium, a group IVb element, a group Vb element, a group VIb element, scandium yttrium, calcium; strontium, zinc, iron, indium, tin, cerium, and holmium, and mixtures of said oxides.

17. A method according to claim 11, including providing the barrier layer configuration to include at least one layer selected from the group consisting of: an oxinitride of Ti, Ta, Zr, Si, Hf and Al; and a fluoride of magnesium, barium, strontium, calcium, a rare earth and lead.

* * * * *